No. 813,529. PATENTED FEB. 27, 1906.
R. G. SMITH.
TIRE.
APPLICATION FILED JAN. 14, 1905.
2 SHEETS—SHEET 1.
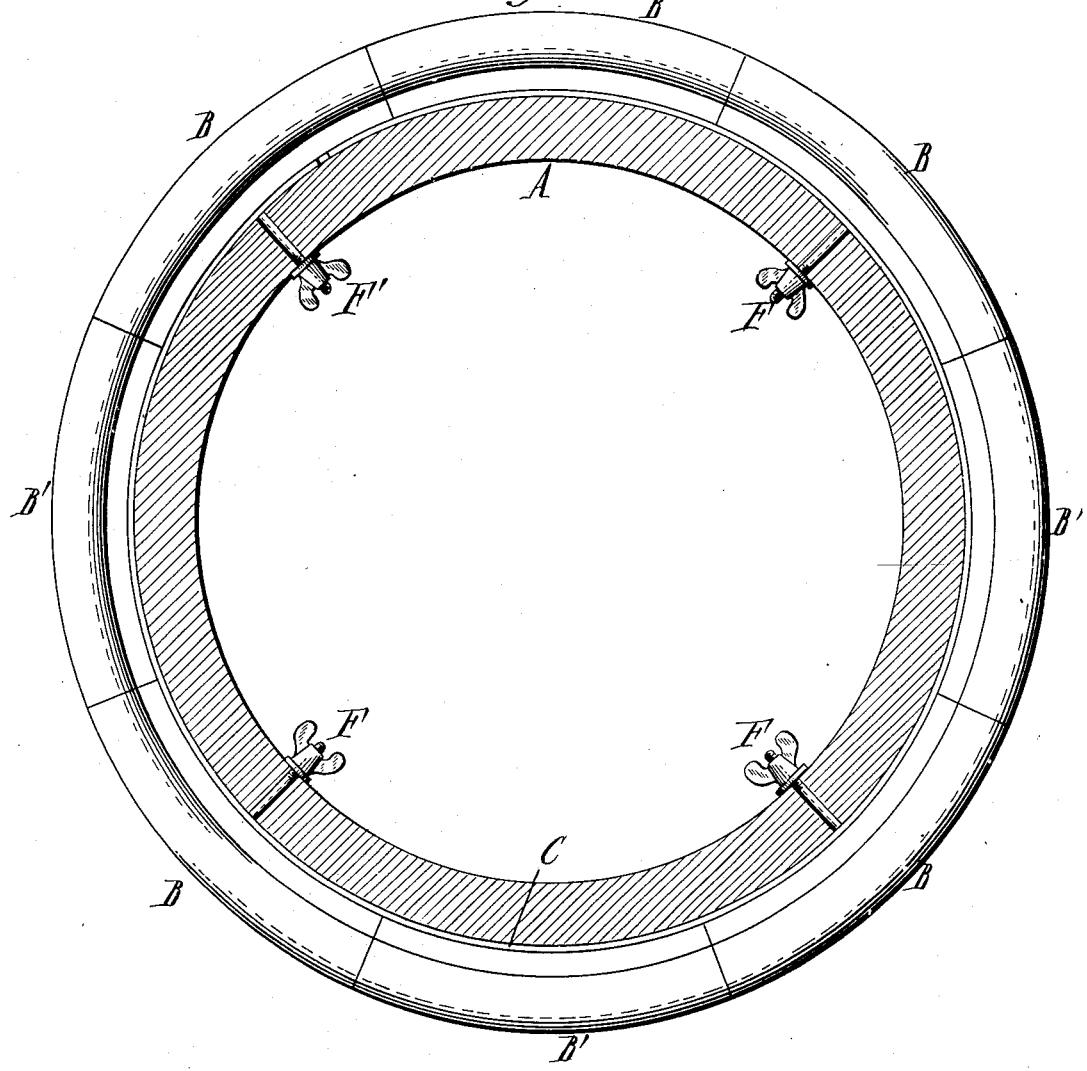
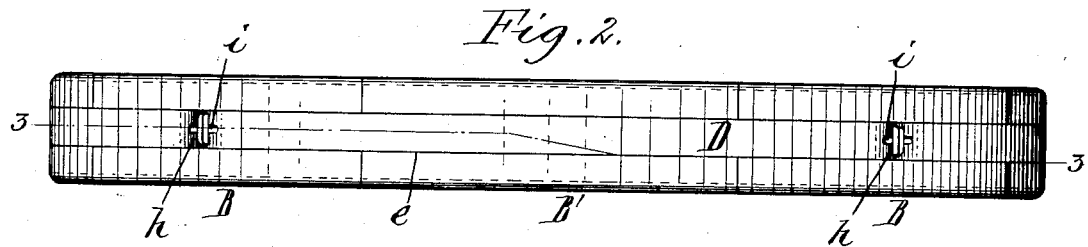
Witnesses:
Robert Weitknecht
Louis M. Gratz
Russell G. Smith
Inventor
By Geyer & Popp
Attorneys No. 813,529. PATENTED FEB. 27, 1906.
R. G. SMITH.
TIRE.
APPLICATION FILED JAN. 14, 1905.
2 SHEETS—SHEET 2.
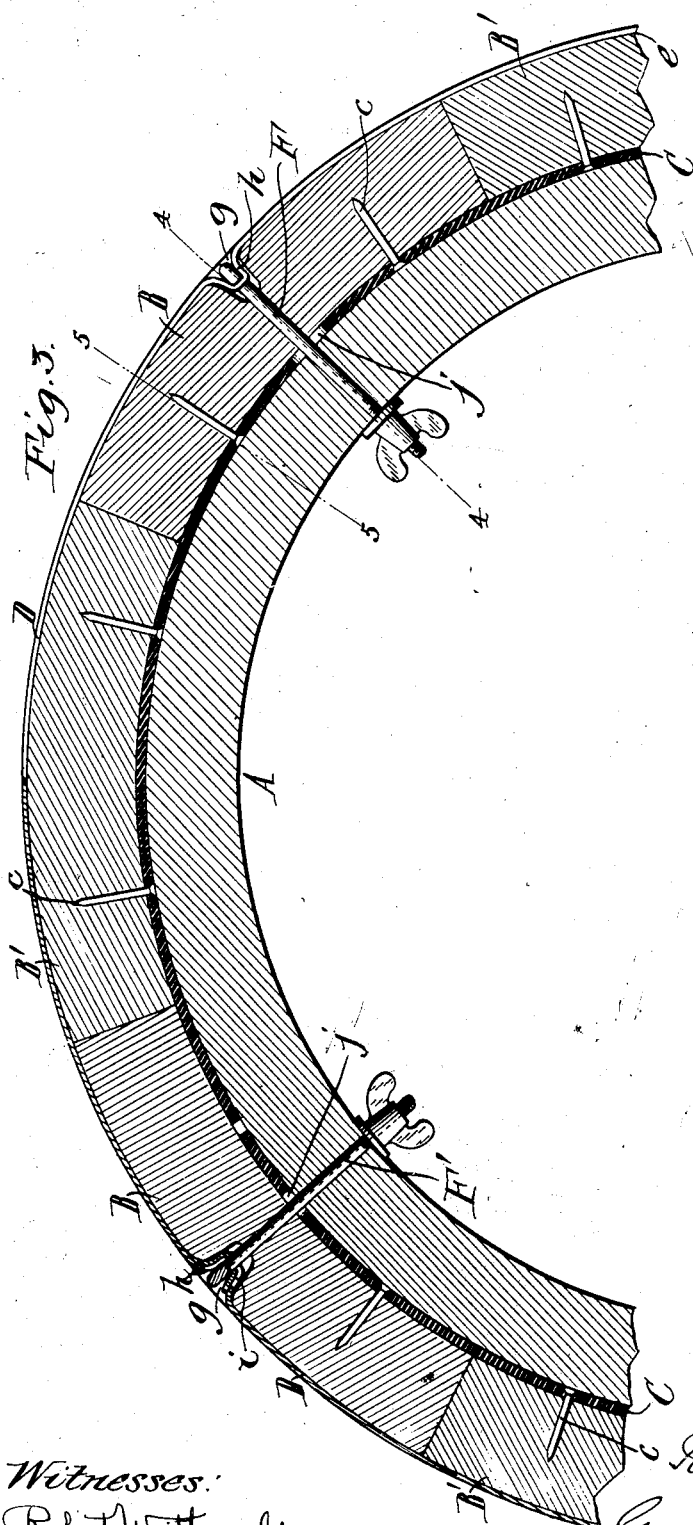
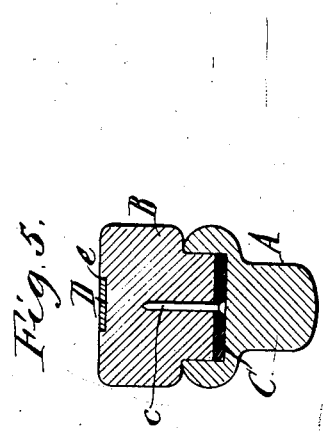
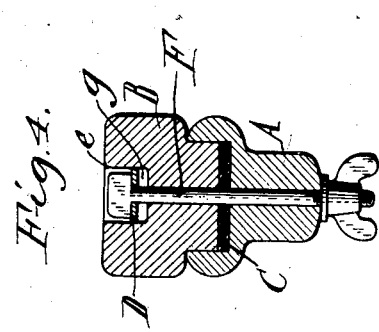

UNITED STATES PATENT OFFICE.

RUSSELL G. SMITH, OF BUFFALO, NEW YORK, ASSIGNOR OF ONE-HALF TO AUTO-CAR EQUIPMENT COMPANY, OF BUFFALO, NEW YORK, A CORPORATION OF NEW YORK.

TIRE.

No. 813,529.   Specification of Letters Patent.   Patented Feb. 27, 1906.

Application filed January 14, 1905. Serial No. 241,023.

*To all whom it may concern:*

Be it known that I, RUSSELL G. SMITH, a citizen of the United States, residing at Buffalo, in the county of Erie and State of New York, have invented new and useful Improvements in Tires, of which the following is a specification.

In automobiling it is a common custom to carry one or more extra pneumatic tires, especially in touring through the country or in making long runs, in order to permit a punctured tire to be readily replaced where the nature of the required repair is such as to render it difficult or impracticable to make the same on the road. This practice is, however, objectionable on account of the extra outlay for tires, which is comparatively large.

The object of my invention is to provide an inexpensive emergency or temporary tire which can be quickly substituted for a disabled pneumatic tire and used until such time as the punctured tire can be conveniently repaired.

In the accompanying drawings, Figure 1 is a side elevation of the improved tire applied to a wheel-rim, which latter is shown in section. Fig. 2 is a face view of the tire. Fig. 3 is a longitudinal section of a portion of the tire and rim, on an enlarged scale, in line 3 3, Fig. 2. Figs. 4 and 5 are cross-sections in lines 4 4 and 5 5, Fig. 3.

Similar letters of reference indicate corresponding parts in the several views.

A indicates a wheel-rim of the kind having a tire groove or channel.

My improved tire consists of a series of blocks, sections, or segments B B', arranged side by side and encircling the rim. These blocks are constructed of some tough and durable wood, as ash, but may be made of any other suitable material. In the preferred construction of the tire shown in the drawings the blocks are permanently fastened by nails c or other means to the outer face of a continuous flexible band C of rubber or similar soft or resilient material. This band lies between the solid blocks and the wheel-rim and forms a cushion which allows the blocks to yield to a limited extent. Adjoining blocks preferably abut at their ends and meet in straight radial joints, as shown. When the wheel-rim is channeled, the cushioning-band is seated in the channel and the base portions of the blocks are reduced to fit into the same, as shown in Figs. 4 and 5.

D indicates a clamping-band or tie member which encircles the tread-faces of the series of blocks and which firmly binds them to the rim. This band, which in its preferred form is narrower than the blocks, is seated in longitudinal grooves e, arranged centrally in the treads of the blocks and forming together a practically continuous annular channel in which the band is confined against lateral displacement. These grooves are of sufficient depth to bring the face of the band flush with or below the tread-faces of the blocks.

F F' indicate suitable fastenings, preferably one or more clamping-bolts, which serve to tighten the band D. In the construction shown these bolts are arranged at suitable intervals and pass radially through the band, the contiguous tire-blocks, the cushion C, and the wheel-rim A, the bolt F' passing through the lapped ends of the band, as seen in Fig. 3. The nuts of the bolts, which for convenience have wings, bear against the inner side of the wheel-rim, while their heads are preferably T-shaped and comparatively narrow. Opposite these heads the contiguous blocks B are provided in the bottom of their grooves e with recesses or cavities g, which receive the bolt-heads and into which the adjacent portions of the clamping-band D are drawn or displaced upon tightening the bolts. By this construction the heads of the bolts are countersunk below the tread-surface of the tire and the band is at the same time locked against longitudinal displacement on the blocks by the indentations h, formed in the band by the bolt-heads. The recesses g are of sufficient depth to leave the necessary clearance under the indentations of the band for tightening the latter as it becomes stretched. In order to permit the necessary longitudinal slippage of the band on the bolts in tightening it, the openings formed therein for the bolts are made in the form of longitudinal slots i. For the same purpose the cushioning-band is provided with similar slots j.

The meeting ends of the cushioning-band C are located opposite the corresponding ends of the clamping-band, and only one of those ends is fastened to the adjacent block B, as shown in Fig. 3, so that upon removing the fastening-bolts F F' the tire can be removed from the wheel-rim.

In case one of the usual pneumatic tires of the vehicle should become punctured the same is replaced by the improved tire. To apply the same to the rim, it is placed in the channel of the rim. The bolt F' is then passed through the lapped ends of the clamping-band and adjacent parts and tightened, and the remaining bolts F are finally put in place and tightened. When thus applied, the tire, though not so yielding as a cushion or pneumatic tire, is satisfactory for temporary service and avoids the necessity of carrying the more expensive extra pneumatic tire. The bolts F F' serve not only to draw the clamping-band taut, but positively fasten the corresponding blocks to the rim, thus reliably preventing creeping, as well as lateral displacement of the tire on the rim.

In standard clench-tire wheels the tire is fastened to the rim by four equidistant bolts. The same number of bolts likewise spaced is sufficient for securing my improved tire to the rim, and the ordinary bolt-holes can therefore be used for this purpose, thus saving the time and expense of forming special bolt-holes in the rim.

When my improved tire is applied to a flat-faced or unchanneled wheel-rim, the clamping-band by interlocking with the grooves of the blocks serves to prevent lateral displacement of those blocks having no fastening-bolts passed through them.

In the detached condition of the tire its blocks can be folded or stacked in a small compass, owing to the flexibility of the connecting-band C, permitting the same to be stored and carried in compact form. The simple construction of the tire renders its cost correspondingly small.

I claim as my invention—

1. An emergency-tire, comprising a flexible band adapted to encircle a wheel-rim, a series of blocks or sections secured side by side to said band by fastenings passing through the band and into the blocks, and means independent of said fastenings for securing the tire to the wheel-rim, substantially as set forth.

2. An emergency-tire, comprising a flexible band adapted to encircle a wheel-rim, a series of blocks or sections secured side by side to the band and constructed and arranged to form the tread of the tire, and a binding member engaging the blocks beyond the face of said flexible band, substantially as set forth.

3. An emergency-tire, comprising a flexible band, a series of blocks or sections secured side by side thereon, a clamping-band encircling the blocks, and means for contracting and tightening said clamping-band, substantially as set forth.

4. A tire comprising a series of blocks or sections arranged side by side and each provided in its tread-face with a longitudinal groove, a clamping-band seated in said grooves, and means for tightening said band, substantially as set forth.

5. A tire comprising a series of blocks or sections arranged side by side, one or more thereof being provided in their tread-faces with recesses, a clamping-band encircling said blocks, and fastening means for the band acting to displace portions of the same into said recesses, substantially as set forth.

6. A tire comprising a series of blocks or sections arranged side by side, one or more thereof being provided in their tread-faces with recesses, a clamping-band encircling said blocks, and fastening-bolts passing through the band and the recessed blocks in line with said recesses and having their heads countersunk in the latter, substantially as set forth.

7. A tire comprising a series of blocks or sections arranged side by side and each provided in its tread-face with a longitudinal groove and one or more thereof having recesses located in their grooves, a clamping-band seated in said grooves, and radial fastening-bolts passing through the band and the recessed blocks in line with the recesses, substantially as set forth.

8. A tire comprising a flexible band, a series of blocks secured side by side to said band and having longitudinal grooves in their tread-faces, a clamping-band seated in said grooves, and means for fastening one or more of the blocks to a wheel-rim, substantially as set forth.

9. A tire comprising a flexible band, a series of blocks secured side by side to said band and having longitudinal grooves in their tread-faces, one or more of said blocks being provided in their grooves with recesses, a clamping-band seated in said grooves, and fastening-bolts passing through said clamping-band and the recessed blocks in line with said recesses and having their heads seated in the latter, substantially as set forth.

10. A tire comprising a flexible band adapted to encircle a wheel-rim, a series of blocks or sections secured side by side to said band, a clamping-band encircling the blocks, the ends of both of said bands being located adjacent to the same block, and means for fastening the blocks and the clamping-band in place, substantially as set forth.

Witness my hand this 12th day of January, 1905.

RUSSELL G. SMITH.

Witnesses:
C. F. GEYER,
E. M. GRAHAM.